US012566794B1

(12) United States Patent
Lichtenberg et al.

(10) Patent No.: US 12,566,794 B1
(45) Date of Patent: Mar. 3, 2026

(54) MEDIA CONTENT FOR ANY REQUEST USING LLMS

(71) Applicant: Amazon Technologies, Inc., Seattle, WA (US)

(72) Inventors: Jan Malte Lichtenberg, Berlin (DE); Fabian Moerchen, Bainbridge Island, WA (US); Francois Mairesse, Berkeley, CA (US); Nicolle M. Correa, Seattle, WA (US); Sandeep R. Rao, San Jose, CA (US); Benjamin La Schiazza, Redwood City, CA (US); Puneet Popli, Sammamish, WA (US); Sergey Mkrtchyan, San Carlos, CA (US); Joaquin A. Delgado, San Ramon, CA (US); Ronak Divyesh Patel, Seattle, WA (US); Emanuele Coviello, La Jolla, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/755,252

(22) Filed: Jun. 26, 2024

Related U.S. Application Data

(60) Provisional application No. 63/559,134, filed on Feb. 28, 2024.

(51) Int. Cl.
| | |
|---|---|
| *G06F 16/632* | (2019.01) |
| *G06F 3/16* | (2006.01) |
| *G06F 16/638* | (2019.01) |
| *G06F 40/40* | (2020.01) |

(52) U.S. Cl.
CPC ............ *G06F 16/632* (2019.01); *G06F 3/165* (2013.01); *G06F 16/639* (2019.01); *G06F 40/40* (2020.01)

(58) Field of Classification Search
CPC ...... G06F 16/632; G06F 16/639; G06F 40/40; G06F 3/165
See application file for complete search history.

(56) References Cited

U.S. PATENT DOCUMENTS

| | | | | |
|---|---|---|---|---|
| 9,715,500 | B2* | 7/2017 | Cue ................... | G06Q 30/0625 |
| 11,451,870 | B1* | 9/2022 | Panchaksharaiah | ......................... H04N 21/44226 |
| 11,972,170 | B1* | 4/2024 | McGilliard ............. | G06F 3/167 |
| 2019/0171410 | A1* | 6/2019 | Oskarsson ............ | G06F 16/683 |
| 2022/0116399 | A1* | 4/2022 | Carrigan ............. | H04L 12/2816 |
| 2025/0173121 | A1* | 5/2025 | Bromand ................ | G06F 3/167 |

* cited by examiner

*Primary Examiner* — Jared M Bibbee
(74) *Attorney, Agent, or Firm* — Athorus, PLLC

(57) ABSTRACT

Described are systems and processes for identifying relevant media content for users in response to natural language requests. The media content may be formed as a playlist of music. Requests may be sent to various models to obtain results, such as a large language model (LLM) and a local search model. Results may be selected from one or both models. The results may be used to fetch media content and provide user interfaces with a playlist with the media content to a user that submitted the request. User interfaces may include selectable search terms suggested for the user and animations during processing of the request.

20 Claims, 11 Drawing Sheets

PROCESSORS
204

MEMORY
206

UI MODULE
208

LLM MODULE
210

LOCAL SEARCH MODULE
212

VALIDATION MODULE
214

MEDIA FETCHER
216

REFINING TOOL
218

DATA SOURCES

MEDIA CATALOG
220

MEDIA METADATA
222

USER DATA
224

TRAINING DATA
226

COMPUTING DEVICES
202

MEDIA CONTENT FOR ANY REQUEST USING LLMS

PRIORITY CLAIM

This application claims priority to U.S. Provisional Patent Application No. 63/559,134, filed Feb. 28, 2024, and titled "Media Content For Any Request Using LLMS," the contents of which are incorporated by reference in their entirety.

BACKGROUND

As music listeners (users) have moved to listening to more music through streaming services, these users have changed the way they consume music. Rather than listening to the same artist for an extended period (e.g., multiple songs by the same artist in a row, often from an album), users often desire to listen to a variety of songs curated for the user's interests at that moment in time.

The music industry has also changed over time. Previously, many artists released content in the form of albums, which included multiple songs and was often promoted heavily by the recording labels or other sources. Now, many artists provide music to streaming services on a song-by-song basis and may release new content multiple times over a span of a couple of months. A larger portion of these artists are independent and not backed by recording labels that promote the music. Thus, the artists are left to other means to have their music discovered by users to create or expand their audience.

Current music services allow a user to select a genre, song, or artist. Some services use this information to select other similar music. However, more complex searches or requests are not possible. Instead, users are left to create (curate) their own playlists, which can be time consuming. Users also want exposure to new music. Existing systems do a poor job of adding new music because new music often doesn't have a strong correlation with other music until more users interact with the new music to create strong correlations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
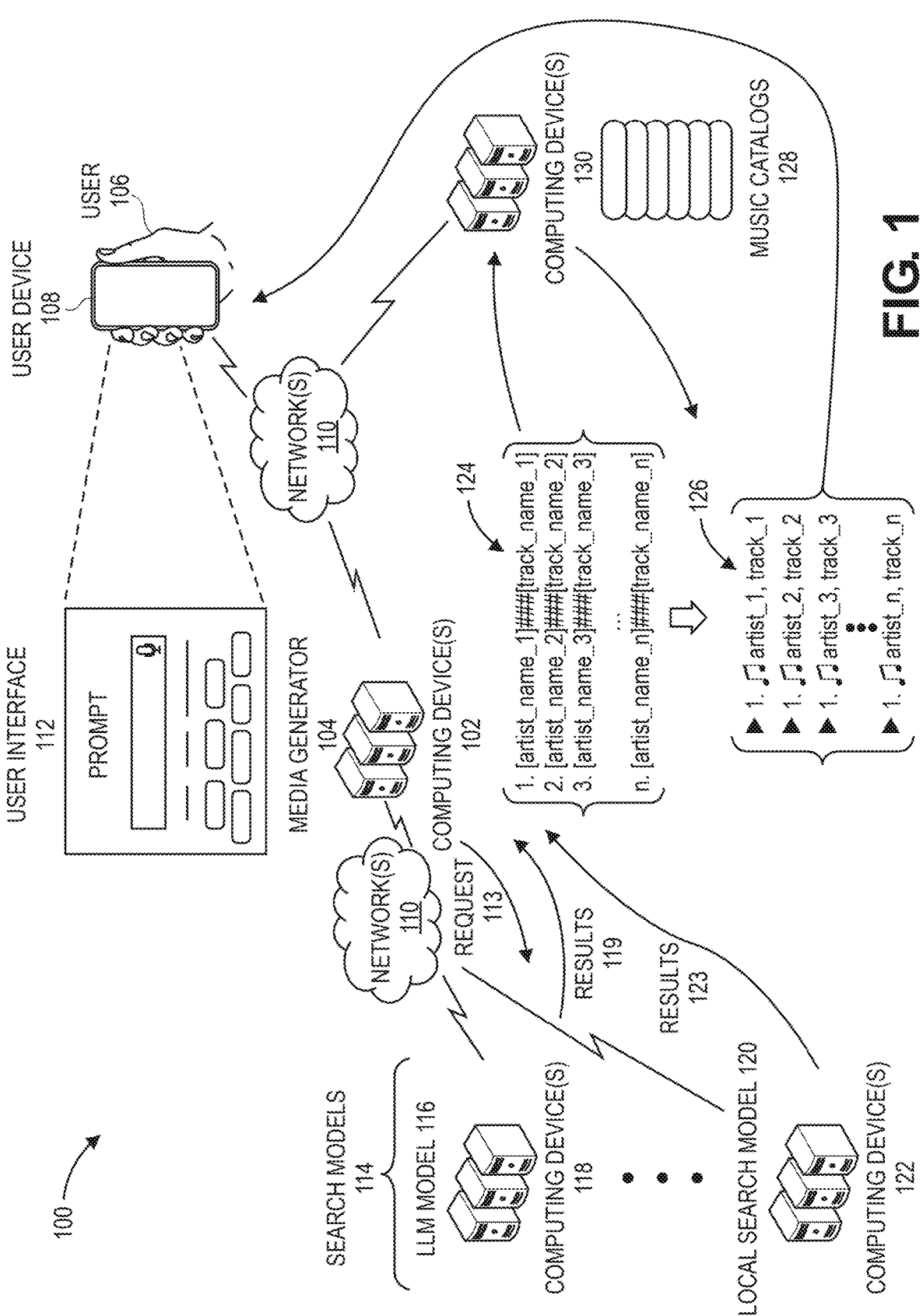
FIG. 1 is a schematic diagram of an illustrative environment to provide media content using large language models (LLMs), according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes identifying relevant media content for users in response to natural language requests. A natural language request may include unstructured data that cannot be satisfied by conventional media content providers that execute searches using structured data. In accordance with some embodiments, requests may be sent to various systems (or "models") to satisfy the requests, where each model may have distinct advantages (to be exploited) and disadvantages (to be mitigated, minimized and/or circumvented). The results of these models may be analyzed to ensure the results are legitimate and correspond to actual media content that can be retrieved from a catalog (or other repository) and provided to a user, such as to a user's mobile device, for consumption by the user. While the media content can include virtually any type of media, the described models may retrieve music tracks for users to create playlists in accordance with various embodiments described herein. The media content may include music, podcasts, audible files (e.g., audio books), text-based books, videos (e.g., shows, movies, documentaries, user created videos, etc.), user generated media, and/or any other collection of media that can be searched and retrieved on behalf of a user in response to a natural language input provided by the user. While the examples provided below focus mainly on music and creation of playlists for tracks of music, these other types of media may be processed using the same or similar techniques.

The techniques may leverage a large language model (LLM) and a local search model to satisfy user requests. However, additional models may be used to respond to requests. While the term "local search model" is used herein, the search model may not be physically local to an entity providing the described services. The search model may be operated by another entity and/or may be hosted in distributed environments, via a cloud computing system, etc. In addition, the search model may provide recommendations and is not limited to exact text matches for providing results. The search model may provide personalized results which leverage user-specific data, such that results for a same search query entered by different users may result in different results that are customized for the respective users. The LLM may be particularly good at processing complex requests and understanding natural language inputs of unstructured data. The LLM may also be capable of using unstructured data in a request to create structured data, which can be used by other search models (e.g., a local search model, etc.). The LLM may also be helpful to expose a user to new types of information that may not otherwise be suggested to the user via traditional services, such as services that rely heavily on correlations from user history. An LLM may be fed inputs and training example data (e.g., instructions) to cause the LLM to process a user request for a playlist of music and output a number of tracks for a playlist. However, use of an LLM does have some limitations. In particular, LLMs tend to have some latency in responses to requests and also do not have access to very recent information. Many LLMs have what is referred to as a knowledge cut-off time/date, which is when new training data was last received by the LLM. This may be hours, days, weeks, or even months in duration. The LLM cannot provide information that was created after the knowledge cutoff since it is not trained with this data. LLMs may not be an ideal source to produce recent music since the LLM may be unaware of new music released after the knowledge cutoff (e.g., in the past hours, days, weeks, or even months). Thus, LLMs often fail to provide content that is really new (i.e. recently created), but instead are limited to providing results based on data accessed before the knowledge cut off for that LLM.

The techniques may also leverage local search models that can fulfill requests based on input of structured data. These models may be particularly good at leveraging a user's historical data to provide personalized information to a user. However, these models may not be capable of fulfilling all types of natural language requests, such as requests for music that rely on more abstract qualifiers such as mood, personal interests, and other non-conventional terminology to retrieve music tracks for a playlist. In particular, local search models often require structured data as an input, which may not be possible with some natural language search requests generated by users. While, these local search models may have little latency, they cannot satisfy all requests and sometimes default to returning content that is very similar to content previously accessed by the user or is somewhat generic. However, local search models can provide new content to users since these models are updated with the latest information and do not have the limitation of the knowledge cut off associated with LLMs. Therefore, the local search models may be particularly apt at providing search results (e.g., recommendations) of new and current artists (especially new releases) right after new content is published by an artist.

As an example, a user may submit a request for a playlist of music, such as "create a playlist with some Taylor Swift but no country." This request may be sent to an LLM for processing. Meanwhile, the request may be parsed in an attempt to create structured data for processing by a local search model, possibly in parallel with processing by the LLM. If the request can be parsed to create the structured data for the local search model and the structured data is meaningful (e.g., capable of returning results intended by the user's request, etc.), then the local search model may be used to return results and provide a playlist of the tracks to the user for consumption. However, if structured data cannot be created for the local search model, then the LLM results may be leveraged to create the playlist of tracks. In some instances, the LLM may be used, first, to understand a query (e.g., parse the query) and to create structured data and then, second, to create a list of tracks for a request, which may be performed by a second call to the LLM or possibly by a different LLM. Since the LLM often includes latency, a media fetcher that locates and provides the actual media to the user's device may attempt to fetch from a music catalog (e.g., make a link to media item, etc.) a first track output by the LLM while the LLM is still generating the full playlist (often done line-by-line as an output). This may satisfy the user and mitigate the perception of latency. The LLM may also output a playlist including a list of artists and tracks, as well as a playlist title and/or description, among other possible information discussed herein. In some instances, some of this information may be sent to the local search model to provide more recent media items that may have been released since the knowledge cutoff time/date of the LLM.

In some embodiments, the LLM may be trained or fed/primed with personalized information for the user that submits the request, thereby creating personalization for the results from the LLM. As an example, the LLM may have an input of example queries and results, which could be personalized based on interests known about the user and fed to the LLM with a new request for a playlist. This personalization may be done (optionally) by summarizing properties of the user in a prompt (user likes a, b, c, etc.), rather than providing exact example queries and track results. Results of the LLM may be analyzed to ensure the results correlate with actual media content since LLMs sometime make up fictious results that do not correlate to accessible media content. If an artist/track recommended by the LLM is fictious or does not exist in a media catalogue accessible by a service, then that recommendation may be ignored and/or removed from the playlist. In some embodiments, the LLM may create reasons for providing certain results, such as by providing additional information about the author or creator of the media content, when the content was created, how the content relates to the user's request, or other information to be associated with results.

The LLM, or another model, may generate additional related content, such as artwork, to accompany the results. In this way, the user may be able to quickly generate a custom playlist that includes, for example, a title, a description, a list of playable tracks linked to media content for consumption by the user, and artwork to display when accessing the playlist and/or contents therein, among other possible content. This information may be shareable by the user with other users in some instances and accordance with rules for sharing content and applicable restrictions imposed on sharing, etc.

FIG. 1 is a schematic diagram of an illustrative environment 100 to provide media content using LLMs, according to an implementation. The environment may include one or more computing devices 102 that host a media generator 104. From a high level, the media generator 104 may receive a request for a playlist from the user with some criteria and then may provide the playlist to the user with suggested artists/tracks that enable the user to access the music. However, the service may provide just a playlist without access to the actual media in some implementations.

The media generator 104 may receive a request for media content from a user 106 via a user device 108, which may be provided in the form of a natural language request or otherwise as unstructured data. The computing devices 102 may be in communication with the user device via one or more networks 110, including wireless and/or wired networks. The user device 108 may be any computing device capable of receiving a natural language request. In some embodiments, the request may be received by a microphone connected to the user device 108. However, the user device 108 may include a display and may be capable of rendering a user interface 112 that provides content to guide the user in submission of a natural language request. The user interface is discussed in greater detail with reference to FIGS. 6 and 7 below.

Through use of the user device 108, the user 106 may provide a natural language request 113 (hereinafter "the request 113") for media content, such as a request for a playlist of music, to the media generator 104. The request 113 may be received as audio, as text, and/or using personalized visual search content provided by the user interface 112 (discussed in greater detail with reference to FIGS. 6 and 7 below). The media generator 104, using the computing devices 102, may send the request 113 to one or more search models 114 for fulfillment to generate information to create a playlist for music or similar arrangement of media content (e.g., list of videos, collection of podcasts, etc.).

The search models 114 may include an LLM model 116 hosted by one or more computing devices 118, a local search model 120 hosted by one or more computing devices 122, and/or other models or resources to generate results in response to the request 113. While the term "local search model 120" is used herein, the local search model may not be physically local to an entity providing the described services or even owned or controlled by the same entity. The local search model 120 may be operated by another entity and/or may be hosted in distributed environments, via a cloud computing system, etc. In some embodiments, the request 113 may be modified, parsed, or otherwise preprocessed prior to transmission to the local search model 120, or possibly for any one of the search models 114. The computing devices 102 may communicate and exchange data with the computing devices 118, 122 via the networks 110 or other networks.

The LLM model 116 may process input data (e.g., formatting, structure, seed data and examples, etc.) from the media generator and the request 113 to create LLM model results 119 (or "results 119") that may include a description, a title, and music tracks that create a playlist of music, among other possible outputs described herein. The input data from the media generator 104 may include training information or other instructions that provide the LLM model 116 guidance on how to satisfy the request 113 to create the results 119. In other words, the input data may provide example inputs and corresponding example outputs, structure for output, parameters, and/or other information usable by the LLM model 116 to translate the request 113 into the results 119. As discussed below in further detail, the input data may be personalized or customized for the user that submits the request, thereby creating a more personalized playlist. The media generator may access user history data to determine such personalized examples as discussed further below with reference to FIG. 2. The request 113 may be unstructured data while the results 119 may be structured data in accordance with structure imposed by the input data. An example of a structure data 124 of the results 119 may be as follows: <Playlist Description: [playlist_description], Playlist Title: [playlist_title], 1. [artist_name_1]###[track_name_1], 2. [artist_name_2]###[track_name_2], 3. [artist_name_3] ###[track_name_3], . . . , n. [artist_name_n] ###[track_name_n]>. In this example, the LLM may output n number of tracks of media content (e.g., music tracks, etc.).

The results 119 from the LLM model 116 may have advantages to be exploited and disadvantages to be mitigated, minimized and/or circumvented. Advantages include ability to respond to virtually any unstructured natural language request. Disadvantages include inaccurate or fake results, latency (delay in returning results), and/or knowledge cutoffs that exclude very current information and media content generated in the last hours, days, weeks, or even months since a knowledge cutoff time/data associated with training of the LLM. The results 119 may be used when local search model results 123 (or "results 123") are not available. However, when the results 123 are available, such as when adequate structured data is extracted from a user request, then the results 123 may be preferable over the results 119 since the results 123 likely include more recent content (no knowledge cutoff) and leverage systems optimized to provide meaningful content based on queries of structured data. When the results 123 are available, then the system may not request a playlist from the LLM in some embodiments as a cost savings measure.

The local search model 120 may include one or more models that can return the results 123, which may include suggested media content for the user 106 (e.g., a playlist of music, etc.). Unlike the LLM model 116, the local search model 120 may not be capable of processing unstructured data. A local search model 120 may be fed structured information that can be associated with existing structured data about corresponding media. The local search model 120 may highly leverage historical user data from the user submitting the request and other users to find correlations, which help provide meaningful results (e.g., a playlist of music that satisfies the user).

The local search model 120 may have some limitations on what data can be processed (e.g., may not process unstructured data). In some embodiments, the media generator 104, or another module or device, may preprocess the request 113 prior to sending the request to the local search model 120. The preprocessing may include parsing (e.g., extracting meaningful information from the request as structured data, etc.) the request to create structured data that can be used by the local search model 120, such as using parsed data from the LLM. As an example, the user 106 may provide a request of "play music by Taylor Swift but no country." This request may be parsed by the media generator 104 (via a request to the LLM) to include "artist: <Taylor Swift>, genre NOT: <country>." The local search model 120 may process this parsed and structured request to provide songs in accordance with the intent of the user. As another example, the user may "play songs by Beyonce, Radiohead, and Kid Rock." This request may be parsed by the media generator 104 to include "artist: <Beyonce>, or artist: <Radiohead>, or artist: <Kid Rock>." Other examples of parsing are possible, and use of negative "NOT" limitations can be used to exclude media content suggestions.

The results 123 may include recent information and media content and may not include knowledge cutoffs as inherent in the LLM model 116. Therefore, in some instances, the results 123 may be desirable to use to obtain media content for the user 106, at least in part. A combination of the results 119 and the results 123 to create content for the user 106 may be desirable in some instances. It may be advantageous to use the results 119 to obtain media content for the user 106, such as when the results 123 are not available, to provide a greater diversity of media content based on complex language models, to respond to requests that cannot be effectively parsed and processed by the local search model 120, or at least parsed to capture an intent of the request, and/or for other reasons.

The media generator 104 may receive structured data from the LLM model 116 and/or the local search model 120 as the results 119 and/or the results 123, which are represented in FIG. 1 as structured data 124. This structured data 124 may include a title, a description, a playlist of tracks (e.g., 1-n), and/or other data. The media generator 104 may process the structured data 124, such as to validate the data. For example, the media generator 104 may verify that content in the structured data 124 exists as media content in music catalogs 128 (or repositories of other media, etc.). The music catalogs may be hosted by one or more computer devices 130, accessible via the networks 110 or other networks. In some embodiments, the music catalogs may include other media types, such as podcasts, videos, audio books, or other digital media. The music catalogs may also include metadata about media items contained therein, such as lyrics, genre, user play history, artist information, fun facts or "X-ray" factoids, and/or other information. Some of this information may be used to select tracks for inclusion in a playlist in response to a user request.

The media generator 104 may retrieve or associate media with each of the tracks in the playlist via interaction with the music catalogs 128 (or media catalogs) and computing devices 130. For example, the media generator 104 may interact with the music catalogs 128 to determine a best match for a track included in the structured data. As an example, the track suggested by a model could be "Artist: Bob Dylan, Track Name: Like a Rolling Stone." The music catalogs 128 may include multiple versions of this song, including live versions, studio recording, bootlegs, acoustic versions, covers by other artists, and/or other versions. The media generator 104 may include logic to select from possible matches in the music catalog 128.

The media generator may create links (or other types of access mechanisms) to enable user playback of music from the music catalogs 128, as a playlist 126. The playlist may be provided to the user device 108 for the user 106 to consume (e.g., interact with, play the music, share with other users, etc.). An example playlist for the request of "play songs by Beyonce, Radiohead, and Kid Rock" may be as follows:

1. Beyonce, Texas Hold'em
2. Kid Rock, Cowboys
3. Radiohead, Creep
. . .
n. Beyonce, Single Ladies However, the playlist may also include other information, such as a title, description, artwork, and/or other information generated by one or more of the search models 114 or other resources as described herein. This example playlist may include new music that would otherwise typically not be known to a LLM as it was created by a local search model that does not include a knowledge cutoff. However, the example playlist above may include some content from an LLM.

In some embodiments, the media generator 104 may provide a partial version of the playlist 126 to the user device 108 (or send access to a track of media) and then, at a later time, send the complete playlist 126 to the user device 108. For example, when the structured data 124 is created from the results 119 from the LLM model 116, which includes latency in returning the results 119, a partial version of the playlist 126 may be sent first. The partial version of the playlist 126 may include one or more tracks, often delivered by the LLM on a line-by-line basis. For example, the partial version of the playlist 126 may only include a first valid artist/track returned by the LLM model 116, and may be provided to the user device 108 while the LLM model 116 continues to generate other results of the results 119 (often as a line by line output by the LLM model 116).

Figure 2:
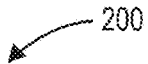
FIG. 2 is a block diagram of illustrative computing architecture to provide media content using large language models (LLMs), according to an implementation.

FIG. 2 is a block diagram of illustrative computing architecture 200 to provide media content using large language models (LLMs), according to an implementation. The computing architecture 200 may include one or more computing devices 202. The computing devices 202 may be implemented locally, in a distributed environment (e.g., cloud devices, virtual devices, etc.), or using a combination thereof. The computing devices 202 may include one or more processors 204 and memory 206 storing various components described in turn.

A user interface (or "UI") module 208 may be used to provide data to the user interface 112 shown in FIG. 1. The UI module 208 may be configured to receive a natural language request that includes unstructured data. In a most basic form, the UI module 208 may prompt a user to submit an inquiry (request), such as a voice request or text request. However, the UI module 208 may provide a personalized example search request for the user based on information about the user, such as information in user data 224. For example, when the user is known to like or consume dance music and often consumes current music, has a history of working out (e.g., consuming exercise content or items, etc.), but shows a historical dislike for explicit language, then an example search suggestion for the user may be generated as "play me some new dance music with a fast tempo that is not explicit." In some embodiments, the UI module 208 may provide visual search suggestions, which may be snippets or other search fragments that are personalized for the user and selectable by the user to create a search. The visual search suggestions may be segments of text, such as "no explicit," "electronic," "happy," "sci-fi," or any other search term(s). The UI module 208 may allow the user to quickly select some of these visual search terms and submit a request, possibly with other terms or words provided by the user via text, voice input, or both. The UI module may be used to perform some or all of the functions discussed below with reference to FIGS. 6 and 7.

An LLM module 210 may facilitate providing input data and a request to the LLM and receiving results from the LLM, such as the LLM model 116. The LLM module 210 may provide two possible outputs, possibly performed by different calls to the LLM model 116 and/or by different LLMs. The first call may be a request to parse a query to generate structured data from a user request. The second request may be to create a list of tracks based on the parsed query. The second request may also request creation of a title, description, and/or artwork for the list of tracks. The LLM module 210 may create the input data (e.g., instructions) to instruct the LLM on how to create results, format an output as structured data, and or provide other instructions/guidance to the LLM. For example, the input data may include formatting instructions, data structure, and/or seed data and examples. Some of this data may be personalized for the user, such as by using the user data 224. For example, if a particular user has a historical preference for certain genres of music, the examples of music and results provided to the LLM with the request may include examples using those preferred genres of music, while using other examples for other uses. However, in some cases the input data provided to the LLM by the LLM module 210 may be generic for some or all users. The LLM module 210 may receive partial data from the LLM (e.g., a partial list of tracks, etc.) and send this partial data to some of the other modules and components discussed below to expedite content delivery to the user.

A local search module 212 may facilitate providing content to the local search model (e.g., the local search model 120 shown in FIG. 1). For example, the local search module 212 may receive structured data from the LLM module 210 after first or initial processing by the LLM. As an example, the user request may be "play songs by Taylor Swift but no country." The LLM module 212 may parse this request as "artist: <Taylor Swift>, genre NOT: <country>." The local search module 212 may send the processed and/or parsed request to the local search model for processing, and then may receive results from the local search model, such as result for a query of [artist: <Taylor Swift>, genre NOT: <country>].

A validation module 214 may inspect the results from the LLM and/or the local search model to ensure the results are valid. For example, the validation module 214 may determine whether the search results conform to the request, indicate real information (not made up or fake data generated by the model), and/or determine whether such content is available to provide to the user (e.g., is a result in the music catalog, does the user's subscription permit access, are their age restrictions on content, etc.). If portions of the results are identified as not valid by the validation module 214, those portions may be removed from the results and possibly replaced with other data. In some embodiments, the validation module may mix results from different models to provide a more diverse set of results for the music playlist or other media content, possibly exploiting advantages of each model while minimizing disadvantages. For example, the validation module 214 may extract recent tracks from the results of the local search model and combine those tracks with tracks provided by the LLM.

A media fetcher 216 may identify corresponding media items in a media catalog 220 (e.g., music repository, video repository, etc.). The media fetcher 216 may associate a media item (e.g., a playable track, etc.) with a track included in the results processed by the validation module 214. The media fetcher 216 may create the playlist 126 shown in FIG. 1, which can be sent to the user for interaction via a user device (e.g., for playback of music, etc.). In some instances, as indicated above, multiple versions of a track may be available in the media catalog. The media fetcher 216 may select a version based on the request, the user data 224, randomly, based on other user data, or in other ways. The media fetcher 216 may access media metadata 222, which may provide additional information about the media. For example, the media metadata may provide information about a creator of the media, the data created, a location, lyrics, transcripts, summarized information, context, or other information about the media. In some instances, some of this information may be served to the user with the playlist. For example, the user may request "create a playlist of songs by artists that performed at the Super Bowl." The resulting playlist may indicate information, possibly from the media metadata 222, when the artist performed at the Super Bowl (e.g., which year) and/or other related information. This information may also be provided by the LLM, in some implementations.

A refinement tool 218 may monitor user interaction with the playlist provided to the user as a result of the processing described above. The refinement tool 218 may use this information to improve the training data, user history data (e.g., user data 224), or otherwise inform processing of future requests and selection of content using results. For example, if the user receives a playlist and skips some media content or stops consuming the content within a threshold amount of time, the refinement tool 218 may capture this information and any inferences about the information to inform the modules and/or data discussed above. In this example, the inferences may be negative and the refinement tool 218 may provide information to lessen a likelihood that similar results or a similar playlist is not provided to that user again. The refinement tool 218 may modify or otherwise update, create, or maintain confidence scores for results, logic, examples, parameters, and/or other data and may update these confidence scores based on user interaction with resulting playlists. If a user consumes an entire playlist, shares the playlist, repeats use of the playlist or takes other actions inferring approval and enjoyment of the results and playlist, the refinement tool 218 may increase corresponding confidence values to motivate the systems to generate similar types of results in the future for this user.

The computing devices may have access to various data sources. The data sources may include a media catalog 220 (e.g., music, podcast, videos, etc.), media metadata 222 (e.g., lyrics, transcript, summaries, etc.), user data 224 (e.g., prior content consumed by users, etc.), and training data 226 (e.g., examples for LLM, etc.). The training data may include data used as the input data for the LLM and used by the LLM module 210.

Figure 3:
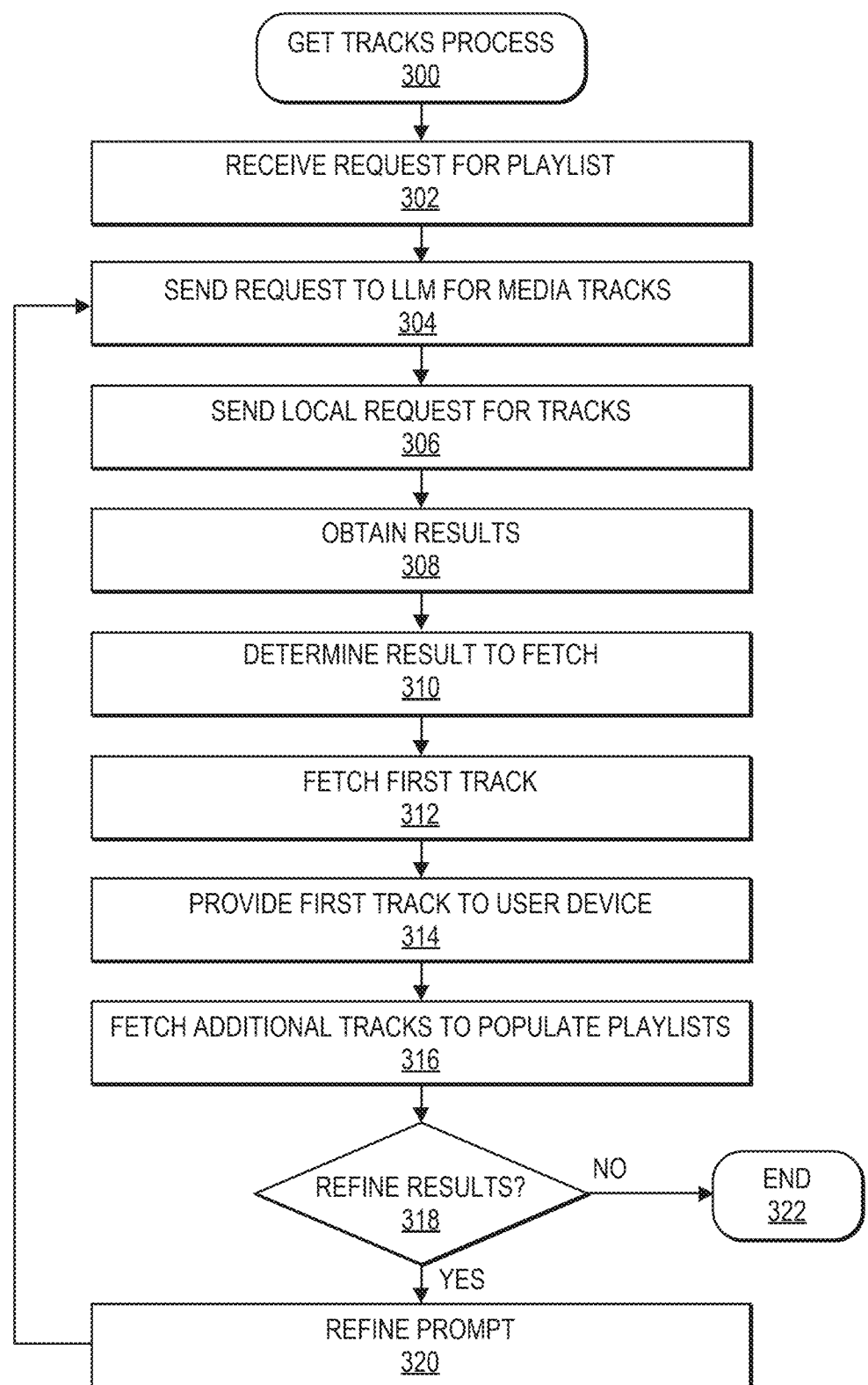
FIG. 3 is a flow diagram of an example process to provide media content using large language models (LLMs), according to an implementation.

FIG. 3 is a flow diagram of an example process 300 to provide media content using large language models (LLMs), according to an implementation. The example process of FIG. 3 and each of the other processes and sub-processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation and any number of the described operations can be combined in any order and/or in parallel to implement the routine. Likewise, one or more of the operations may be considered optional. Various operations from different processes may be combined in accordance with various embodiments.

The process 300 may begin by receiving a request for a playlist of media such as music, as in 302. The request may be received from a user interface that is populated by the user interface module and accepts natural language input of unstructured data. The input may be audio input, which may be converted to text by a speech to text algorithm. The input may include selection of visual search suggestions, which may be associated with text to be included in the request, possibly with other input data (text, speech) provided by a user. The input may be imagery, which may be analyzed to determine words associated with the image and used to seed a search. The input may include other audio, such as a recording of some other music or sound, which can be analyzed to extract descriptors and used to seed a search.

A request may be sent to an LLM for (1) understanding of the request to create structured data from the request, and (2) media tracks based on the understanding of the request, as in 304. For example, the LLM module 210 may receive the request and may send it to the LLM or possibly to multiple LLMs for fulfillment. The request may be sent to the LLM proactively to reduce latency in receiving results from the LLM. The request may include input data that provides examples formatting and structure of data to be received by the LLM. The request may include certain information to be returned by the LLM such as structured data, and for track results including a title, a description, a listing of tracks, artwork, and or other information to be provided by the LLM in response to the request.

The request may be sent to the local search model for results, along with the structured data from the operation 304, as in 306. As discussed above, the request may be preprocessed by the LLM such as to parse the natural language to create a request that is usable by the local search model. For example, the request may be analyzed to determine information such as artist, genre, temporal information, or other types of information that can be used to create structured data that can be fed to the local search model to produce results of a playlist of media content for the user. However, in some instances, some of the natural language input of the request may not be capable of being processed and submitted to the local search model. It is possible that none of the words of the request may be parsed to create structured data therefore the request may be a null request. At least some of the processing from the operations 304 and 306 may be performed in parallel. For example, once the structured data is returned from the LLM at the operation 304, the determining of the tracks by the operation 304 (via the LLM) and by the operation 306 (via the local search model) may be performed in parallel.

Results may be obtained from the LLM and/or the local search model, as in 308. In some instances, the results from the local search model may be returned first and before the results from the LLM since the LLM often has more latency.

The results to fetch (further process) may be determined, as in 310. The results to fetch may be based on arbitration logic to select tracks from the LLM and/or the local search model for inclusion in a playlist. The arbitration logic may compare at least the request in the natural language to an amount of structured data returned by the LLM for that request. If little or no structured data is returned, than the arbitration logic may favor playlist results being populated from the LLM since the local search model has limited or no structured data to use to perform a search to fulfill an intent of a user's request. The arbitration logic may also include consideration of a recency of results implied by the request. In some instances, the request may indicate a desire for recent content, which may indicate a preference for results from the local search model since the LLM has a knowledge cutoff and may not provide as recent results as the local search model in some instances.

In some embodiments, a first track may be verified and fetched from the media catalog, as in 312. The results may be verified as being real (i.e., existing in a catalog of media) and available in the catalog for fetching. In some instances, the first artist and first track may be deemed invalid, such as being fictitious information, not available in the media catalog, or otherwise not available for retrieval, such as when the results are provided by the LLM. In such instances, a next track may be used instead, until a valid track is found that can be fetched (e.g., maps to a real artist and track in a catalog). In various embodiments, results from multiple models may be mixed or otherwise combined for use to populate the playlist. For example, the LLM may return a line of information that includes a first artist and a first track in response to the request as the LLM continues to process the request to create a full playlist. The media fetcher may use this first artist and first track to find corresponding media in a media catalog and fetch the content. The media fetcher may associate the first track and first artist with a media entry in the media catalog. This may require the media fetcher to choose among multiple possible valid results. In some instances, the media fetcher may choose one of these media items based on user information, prior results, popular results, or other criteria or data.

The first track may be made accessible to the user via the user device, as in 314. For example, the media fetcher may create a link to the content or otherwise provide access to the content via a playlist that may be provided to the user. The first track may be associated with the playlist and provided to the user via the user device to enable consumption of the media content (e.g., the music song, etc.). The first media content may be provided to the user device while other results are obtained, such as from the LLM that has latency in providing results.

Additional results may be received and fetched, as in 316. For example, the LLM, may provide additional lines of results of artists and tracks that can be fetched by the media fetcher from the catalog after verification and validation. The additional results may be fetched and provided to the user via the user device such as via a link in a playlist. The media content that is fetched may be provided to the user in other ways as well. For example, the music may be streamed to the user without providing text to a user interface.

The system may determine whether to refine the results, as in 318. For example, the UI may enable a user to submit additional criteria or qualifiers in an additional request that may be used to update the playlist. When the user submits additional criteria such as "add more songs by artist X," or "remove songs by artist Y," or "put more songs in that are recent," such requests may be sent to the models for fulfillment to create modified results. The results may include some of the same results as received in the step 308. Thus, the techniques may enable refining results via submission of additional requests. In some embodiments, the results may be refined by selection provided by a user that corresponds to items in a playlist, as shown in FIG. 6B and described below.

When the search is refined with more natural language input and unstructured data as determined from the "yes" route from the decision 318, the system may provide a prompt and/or other interface control to capture the refinement (modified request, additional criteria, etc.), as in 320. Following the step 320, the process 300 may continue to 304 for further processing using the refinement and possibly the results from a last iteration at step 308 to create refined results (processing steps 304-318 again). In some embodiments, when the refinement doesn't require parsing a request/query and the results can be processed by a local request via the operation 306, the processing may move from the operation 320 to the operation 306. The process may continue accordingly until no refinement is requested at 318. The process may end at 322 following a "no" route from the decision 318.

As one example of a refinement, the service may receive a request of "rock music" and return a prompt ("blues rock or classic rock"), possibly with selection controls for each option. The prompt may be provided along with a playlist, thereby allowing the user to easily refine the playlist using one of the suggested options.

In various embodiments, a user may have an existing playlist or may manually create a playlist and then edit the playlist, via refining, as discussed herein. For example, a user may access a saved or older playlist and request the service to "update this playlist with similar music" or "add some current items into this playlist," among other possible requests to refine an existing playlist or use an existing playlist as an input to create a new playlist.

Figure 4:
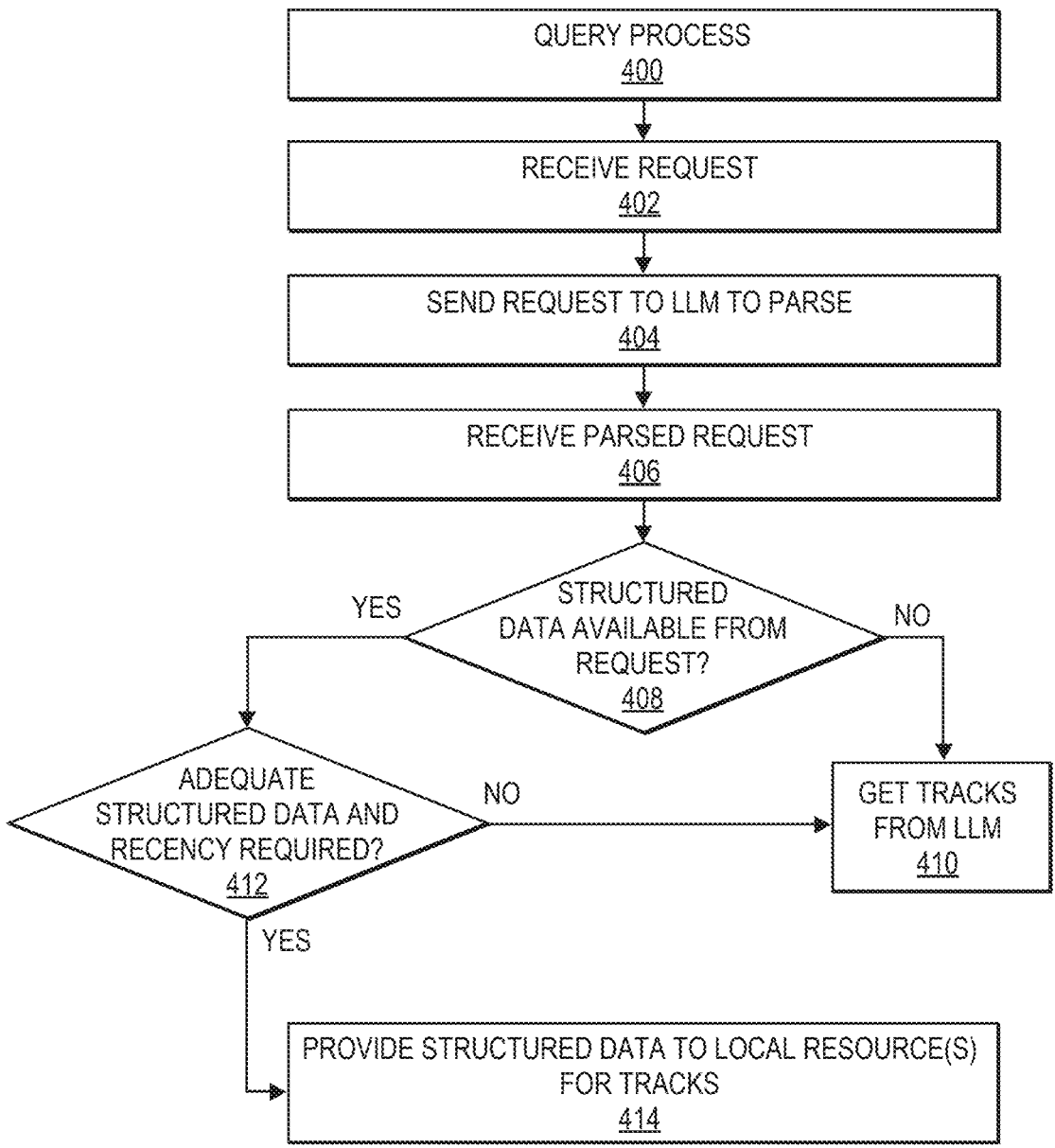
FIG. 4 is a flow diagram of an example process to submit requests and determine search results for further processing, according to an implementation.

FIG. 4 is a flow diagram of an example process 400 to submit requests and determine search results for further processing, according to an implementation. The process 400 may provide some additional details regarding at least the operation 310 described above with respect to FIG. 3. The process 400 may begin by receiving a request from the user devices via the UI, as in 402. The request may be a request for a media playlist of music or other media content. The request may be a natural language input of unstructured data. The input may be audio input, which may be converted to text by a speech to text algorithm. The input may include selection of visual search suggestions, which may be associated with text to be included in the request, possibly with other input data (text, speech) provided by a user.

The request may be sent to the LLM to parse the query and create at least some structured data, as in 404. In some embodiments, additional information may be sent with the request or in association with the request as part of the step in 404, such as the input data (e.g., instructions) described herein. This data may be used by the LLM to define parameters, outputs, personalized examples for the user that created the input, and/or other data for use by the LLM to create meaningful results in response to the request.

A parsed request may be received from the LLM as a result, as in 406. The parsed request may include at least some structured data, such as data that is associated with a label (e.g., artist, genre, album, etc.). However, in some instances, no structured data may be returned by the LMM, such as when the LLM is unable to identify structured data. As an example, a request of "make a playlist of happy music" may result in no structured data being returned by the LLM whereas a request of "make a playlist with songs by Aerosmith and other classic rock bands" may include structured data from the terms "Aerosmith" (artist) and "classic rock" (genre). The parsed request may also indicate whether the request is for recent media. For example, the LLM may analyze the request in accordance with instructions provided to the LLM to cause the LLM to determine whether the user is requesting current or new media that may have been created, produced, or published after a knowledge cutoff date associated with the LLM. In addition, the request may be analyzed to determine that any structured data received at the operation 406 is suitable to fulfill the users request from the operation 402. For example, when a request is for "Taylor Swift songs about heartbreak" and the structured data returned is "Taylor Swift, Artist", then the structured data is not suitable to provide meaningful results since the qualifier "about heartbreak" is not included. Thus, the request may be analyzed, scored, and/or otherwise determined as being suitable to provide meaningful results to the user in accordance or consistent with the request from the operation 402.

The process 400 may determine whether structure data is available from the operation 406, as in 408. For example, the request from the operation 402 may be processed to determine that some portions of the request can be associated with structured data while other portions are not able to be associated with structured data. When no portions of the request are associated with structured data (e.g., "happy music" request), following the "no" route from the decision operation 408, then processing may advance to an operation 410.

A request may be transmitted to the LLM to get tracks for the request using the request from the operation 402 and any other relevant data available, such as user information, which may be used to select personalized tracks for the user based on the request. For example, the request of "make a playlist of happy music" might be processed by the LLM along with information about the user's like of Reggae music to return a result of a track of music titled "Don't worry, be happy" by the artist Bobby McFerrin.

When portions of the request are associated with structured data as determined at the decision operation 408, then following the "yes" route from the decision operation 408, processing may advance to a decision operation 412. A determination is performed based on arbitration logic that determines at least whether adequate structured data is provided from the request and the request is for recent media, as in 412. The recency may be determined by the LLM in the request from the operation 404. The adequacy of the structured data may be based on a threshold. The threshold may be that the data includes adequate structured data when data of a certain type (field/label) is received at the operation 406. For example, the structured data may be adequate if it includes an artist label or a genre label, but may not be deemed adequate (threshold not passed) if the only label of structured data is a title of a song. In some embodiments, the arbitration logic may compare the initial request to the structured data to determine a closeness or similarity score, which may be compared to a threshold. The similarity may be based on total words included in the request and structured data, for example. The similarity score may be high if the amount of structured data (e.g., words associated with a label, etc.) is similar to an amount of words in the request, wherein the similarity score may be low if few or no structured data is returned from a request that includes many words. The threshold may be a tuning preference by the system and used to control where data is to be processed by the LLM or by the local search model as an output of this decision operation. When the structured data is not adequate (less than threshold, etc.), and no recency is requested, then the process may advance to the operation 410 following the "no" route from the decision operation 412. When the structured data is adequate and recency is requested as determined by the LLM in the operation 406, then processing may advance to an operation 414 via the "yes" route from the decision operation 412. In some embodiments, the process may be tuned to follow the "yes" route when possible, such as when recency is requested and at least some structured data is received from the operation 406. Recency may be defined as a being within a threshold amount of time since a received user request, such as in the last thirty days (threshold of 30 days), and may align with a knowledge cut off of an LLM.

The parsed information from the request received from the operation 406 may be sent to the local search model for processing to generate results (e.g., a playlist of media such as music), as in 414. The request that is sent to the local search model may be different than the request provided by the user via the UI and may include structure and possibly less criteria. However, the local search model may process this request leveraging other data, such as the user data 224, thereby creating more personalized results. The local search model may also provide results without a knowledge cutoff, such that results may include recently released media that was released as recent as the same day as the request is submitted.

Figure 5:
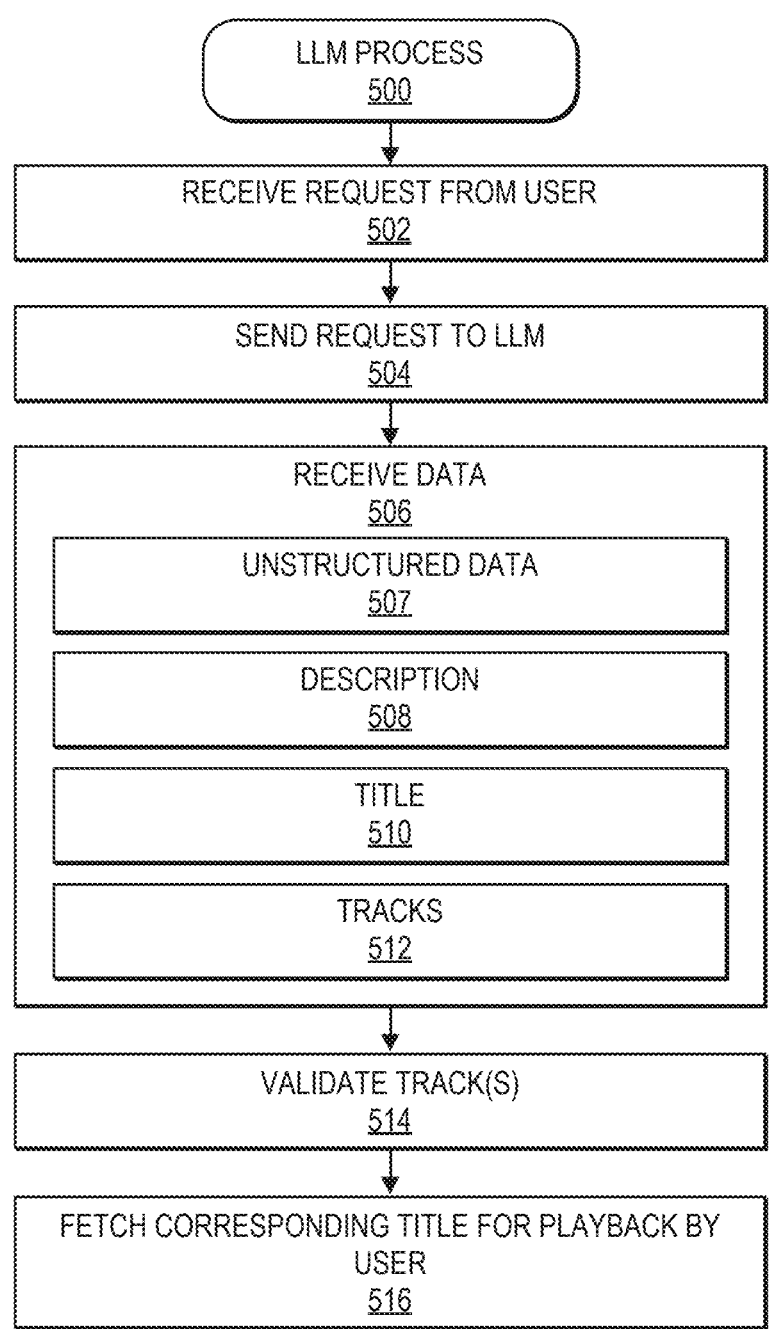
FIG. 5 is a flow diagram of an example process to exchange data with an LLM, according to an implementation.

FIG. 5 is a flow diagram of an example process 500 to exchange data with an LLM, according to an implementation. The process 500 may begin by receiving a request from the user 502, such as via a user device having the UI. The request may be a request for a media playlist of music or other media content. The request may be a natural language input of unstructured data. The input may be audio input, which may be converted to text by a speech to text algorithm. The input may include selection of visual search suggestions, which may be associated with text to be included in the request, possibly with other input data (text, speech) provided by a user. In some embodiments, the request may be inspected to determine whether the request is appropriate and acceptable for issuance to the LLM. For example, a service may have policies that are enforced to ban or not process toxic, offensive, hateful, or other types of requests.

The request may be sent to the LLM, as in 504. In some embodiments, additional information may be sent with the request or in association with the request as part of the step in 504, such as the input data described herein. This data may be used by the LLM to define parameters, outputs, personalized examples for the user that created the input, and/or other data for use by the LLM to create meaningful results in response to the request (i.e., a relevant playlist of media for the user). The input data may provide examples formatting and structure of data to be received by the LLM. The request may include certain information to be returned by the LLM such as a title, a description, a listing of tracks, artwork, and or other information to be provided by the LLM in response to the request.

The LLM may generate results based on the request and the input data, and the results may be received by the service, as in 506. The results may be generated line by line and may be received by the service over time after some delay (latency).

The LLM may generate at least some structured data based on the natural language request received, as in 507. The structured data may include data corresponding to labels and/or fields, such as "artist," "genre," "title," "year," etc. Some data in the request may not be converted to structured data, such as when the LLM is unable to associate data with labels/fields. In some embodiments, this structured data from the operation 507 may be used as at least part of an input to the local search model. However, other outputs of the LLM, discussed below, may be generated. In some embodiments, a first processing by the LLM in response to a first request (and first instructions) may generate the structured data in the operation 507, whereas other outputs described below may be generated in response to a second request (and second instructions) provided to the LLM.

The LLM may generate a description based on the request and the input data, and the description may be received by the service, as in 508. The description may include the natural language request or may include other language generated by the LLM in response to the request. The description may be generated based at least in part on the structured data.

The LLM may generate a title based on the request and the input data, and the title may be received by the service, as in 510. The title may be similar to the request and/or at least some of the input data, or may be based on other information, such as when the request was received, information about the user, or other relevant information.

The LLM may generate tracks of media content for a playlist based on the request and the input data, and the tracks of media content for the playlist may be received by the service, as in 512. The artist/track information may be generated line by line. Because the LLM may output information in this manner, it may be advantageous to fetch a first result that is validated and send it to the user for playback while the LLM continues to output results for receipt by the service.

In some embodiments, other information may be received from the LLM by the service, such as artwork related to the playlist, description, or title; reasoning behind the selection of the tracks; structured data for use as input to the local search model; or other relevant information.

The service may validate the results of the LLM, as in 514. The validation may determine whether the results conform with the structure defined for the output (e.g., description, title, tracks), the information can be associated with real media (e.g., not fictious data or gibberish), and the content is available in the media catalog accessed by the service. Some or all of these validations may be performed at the step 514, possibly along with other validations.

The media fetcher may fetch media content based on the resulting tracks provided by the LLM. If the media fetcher is unable to locate a track, the track may be omitted from the playlist. In some embodiments, the LLM may be requested to provide additional tracks to account for these missing tracks or additional requests may be provided to the LLM when more tracks are needed due to some being missing from an available catalog.

Figure 6A:
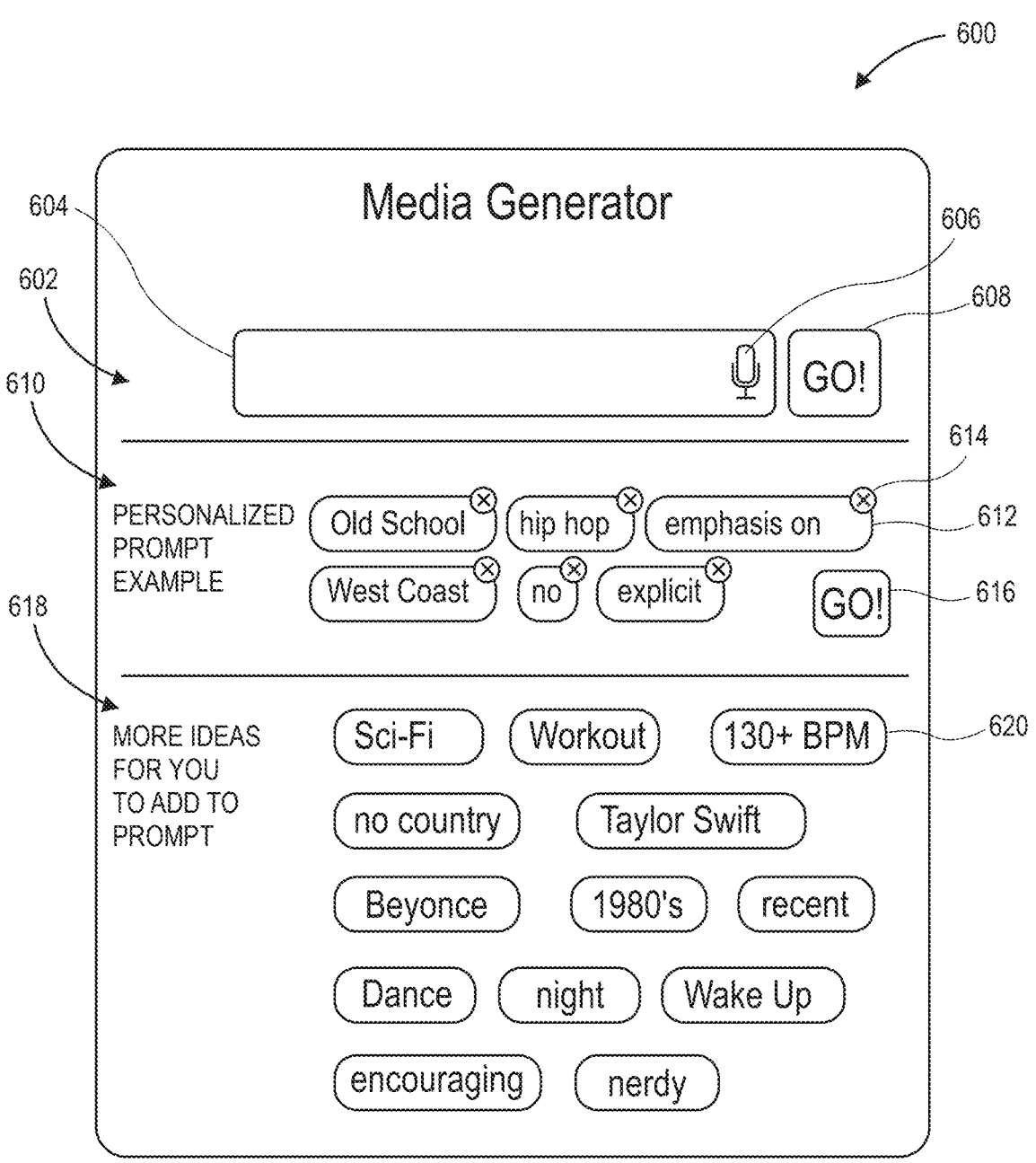
FIG. 6A is an illustrative user interface providing personalized content to initiate fetching of media content using unstructured input, according to an implementation.
Figure 6B:
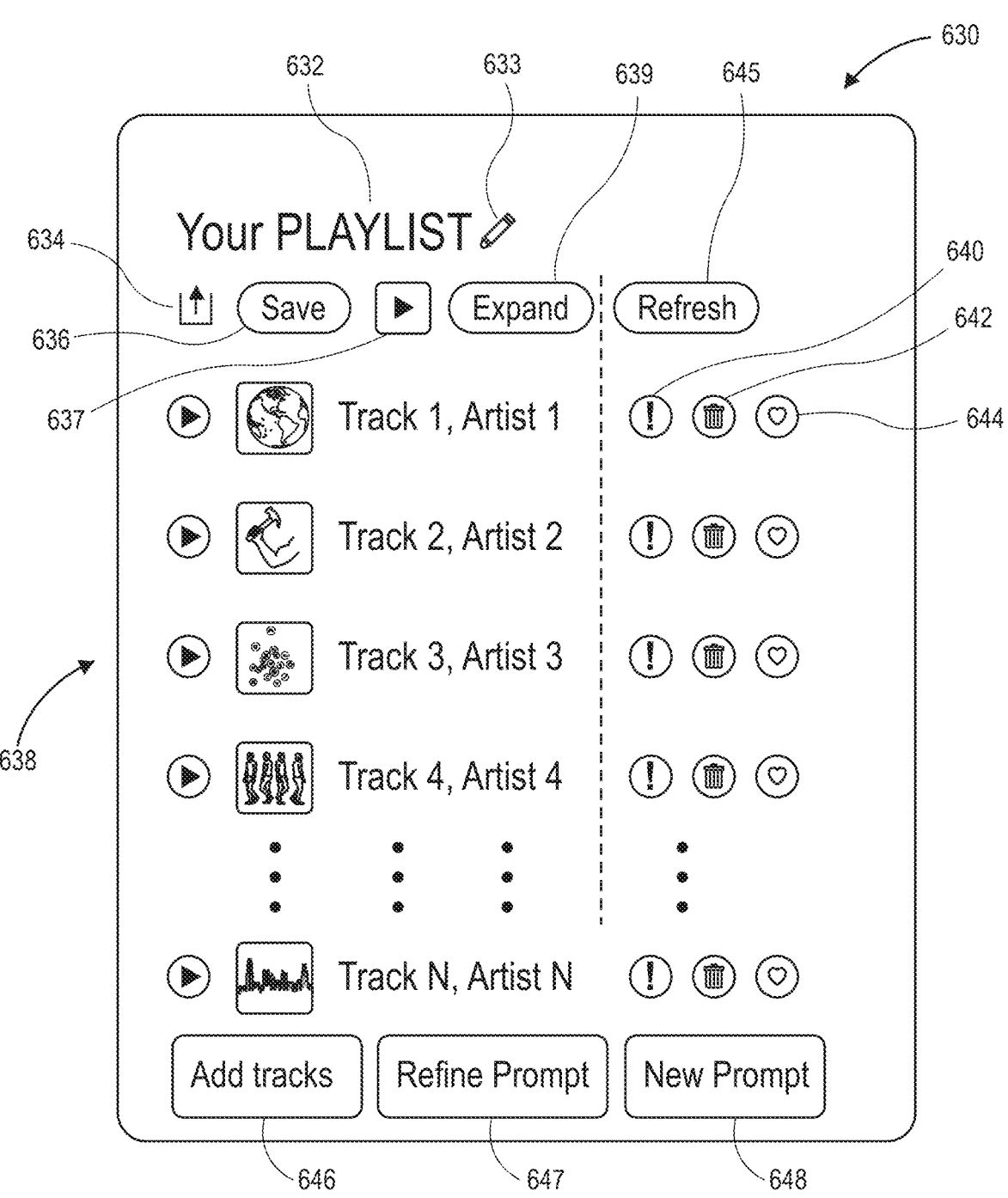
FIG. 6B is an illustrative user interface providing an example playlist and example controls to refine the playlist, according to an implementation.

FIG. 6A is an illustrative user interface 600 providing personalized content to initiate fetching of media content using unstructured input, according to an implementation. The user interface 600 may include a search portion that includes an input field 604 to receive unstructured input via a natural language request for a playlist of media, such as music. The input field may be populated by text typed by a user, by audio received in response to selection via a microphone input 606 and converted to text (via a speech to text algorithm), or by selection of visual search suggestions described below. The text or content provided in the input field may be the request that is sent to the search model(s) as discussed above, such as in response to submission of the request using a submit command 608.

The user interface 600 may include a personalized example section 610. The personalized search example may be an example request that is created based on information for the user and personalized for that user, such as being based on the user data 224 or other data about the user, such as prior requests. The example may be a full unstructured natural language request, such as "old school hip hop emphasis on west coast no explicit." The user may select a submit command 616 to execute this request. The example may be formed with visual search suggestions 612, which may be snippets or words. Some of the visual search suggestions may be removed using a control 614. For example, if the user likes the example search in the personalized example section 610, but wants to remove "emphasis on" and "west coast," the user may select the control 614 to remove those visual search suggestions and may select the submit command 616 to cause submission of the request "old school hip hop no explicit."

The user interface 600 may include a visual search suggestion section 618 that may be populated with personalized visual search suggestions for the user, such as the visual search suggestion 620. The personalized visual search suggestions may include virtually any words, such as names of artists, names of songs, genres, moods, personal interests, temporal information, feelings, things to exclude or omit, or other text. The personalized visual search suggestions may be generated based on user data associated with the user, prior searches by the user, or other personalized information. The visual search suggestions may be added to the input field 604 and may be combined with other information, such as text inputs, voice inputs, and/or part or all of the example search from the personalized example section 610. By providing the personalized visual search suggestions, a user may quickly create interesting playlists, such as by finding inspiration by the suggestions. The suggestions may be refreshed from time to time, such as each time the user accesses the user interface 600, in response to a refresh request, or at other times.

FIG. 6B is an illustrative user interface 630 providing an example playlist and example controls to refine the playlist, according to an implementation. In response to a request, the system may generate the UI 630. The UI 630 includes a title 632 shown as "playlist," which may be generated based on the input. For example, the title may be based on words used in a request. An edit control 633 may enable modification of the title 632.

The UI 630 includes results 638, which may be tracks of music or other media items that are selected in response to a user request. The UI may provide an image, a title, an artist, a play control, and/or other controls or information for each item in the results 638. The UI 630 may include a download control 634 to download the tracks to a device or otherwise share the tracks to a device or account of the user or other users. The UI 630 may include a save control 636 to save the results 638, such as to save the playlist with the title 632, results 638, and/or possibly with other data generated in response to a user request.

The UI 630 may enable a user to refine the results by providing any of the following controls. An expand control 639 may add more tracks or media items to the results 638 to expand the results. For example, a default number of items may be returned (e.g., 15 items), and selection of the expand control 639 may add a predetermined additional number of media items to the results 638 (e.g., add 10 to create a total of 25 items).

The UI may include various controls associated with respective media items. The various controls may include any of an emphasis control 640, a delete control 642, and/or a like control 644. These controls, when selected, may cause the system to update the results 638 in response to selection of a refresh control 645. The emphasis control 640 may be used to indicate a user's desire for more media items like the corresponding result. The delete control 642 may be used to indicate a desire to remove the media item from the results 638. The like control 644 may be used to indicate that the user is satisfied with the result but may not desire more of the same artist. Thus, the like control 644 may be used to validate that a result is accurate and/or acceptable to the user.

The UI 630 may include an add tracks control 646 which may enable a user to add additional tracks to the results 638 by manually selecting additional tracks or submitting another request which adds more tracks to the results. The UI 630 may include a refine search control 647 that enables the user to add refinements to a search query (e.g., the user request", or possibly a new request that modifies the current request. For example, the user's original request may be "make a playlist of rap music" and the refined request input using the refine search control 647 may include either "make a playlist of west coast rap music" or just "west coast rap", which may be processed to refine the results 638 to be modified from showing rap tracks to showing west coast rap tracks. The UI 630 may include a new search control 648, which may enable the user to input a new search or request for a new playlist. For example, the user may select the new search to start over and create a new playlist.

Figure 6C:
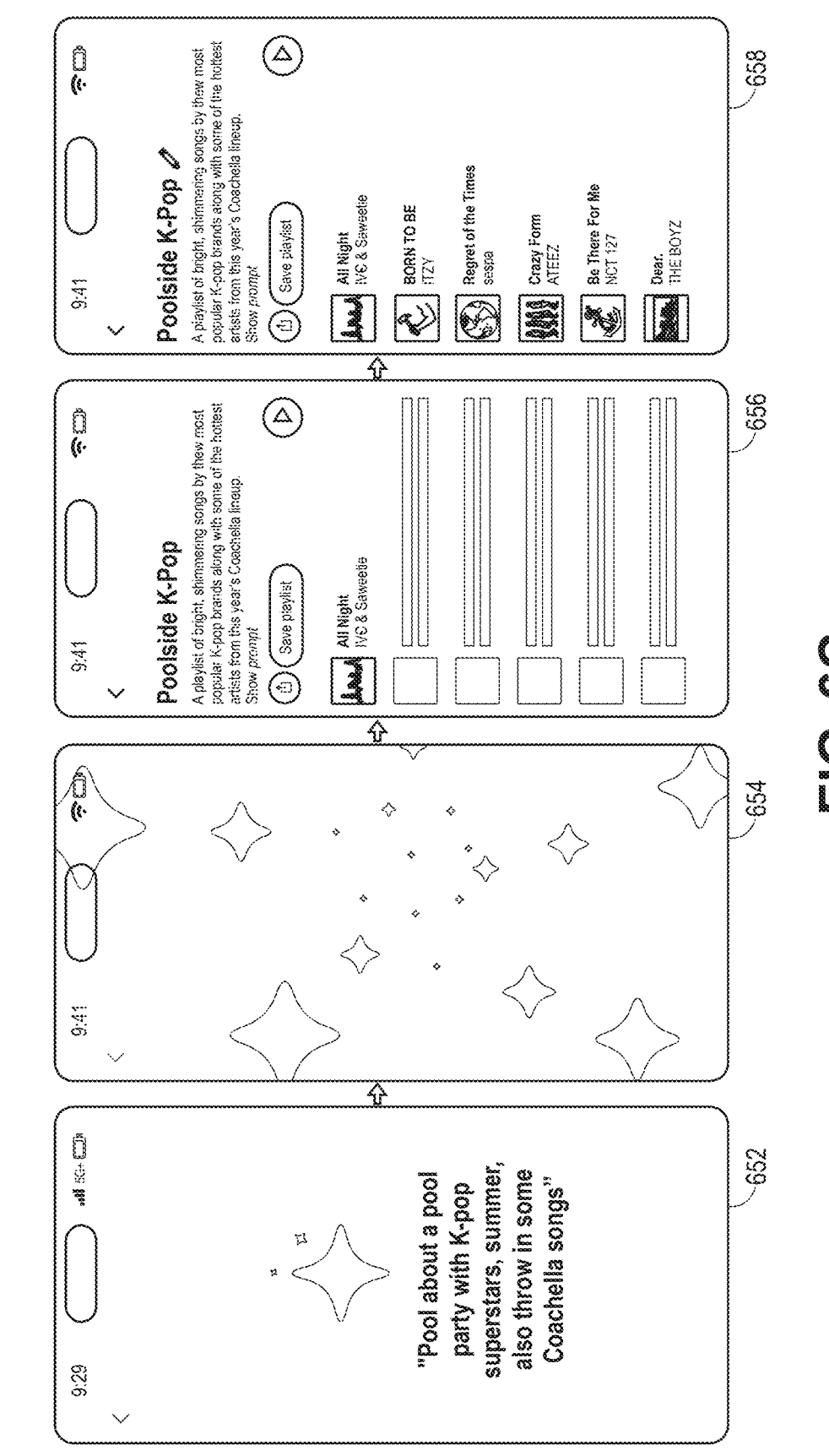
FIG. 6C shows illustrative user interfaces that may be presented to a user in response to submission of a request, according to an implementation.

FIG. 6C shows illustrative user interfaces 650 that may be presented to a user in response to submission of a request, in accordance with an implementation. The user interfaces 650 may depict content that is shown in a single user interface over time, such as during different instances of time after submission of a request. A first UI instance 652 may show animations of stars or other imagery and a request submitted by the user, such as "Pool about a pool party with K-pop superstars, summer, also throw in some Coachella songs." A second UI instance 654 (e.g. refreshed of the same UI) may show an animation while content is loading, models are executing the request, or during other processing. The animation may include a plurality of variously-sized user interface elements, such as objects moving in a visually appealing and artistic manner. The animation may be stars falling or otherwise moving or any other fun and interesting content to momentarily entertain a user. The animation may be displayed for a short period of time, such as matter of seconds while additional content is processed, loaded, fetched, or the like. Another possible animation may depict the service conveying that it is thinking, and then a title and description appear as if the service is writing (e.g., handwriting, typing, etc.) the content, and then tracks show up. A third UI instance 656 may provide partial results with placeholders for additional results, such as additional tracks. The third UI instance 656 may include a title, such as "Poolside K-pop." The third UI instance 656 may include a description, such as "A playlist of bright, shimmering songs by the most popular K-pop bands along with some of the hottest artists from this year's Coachella lineup." The third UI instance 656 may include a first track of "All Night" by "IVE & Saweetie." A fourth UI instance 658 may include other tracks as the tracks are received from the models and fetched from the media catalog. Tracks may be added as they are retrieved, in batches, in piecemeal, or a combination thereof. Once a track is shown in the UI, the user may cause playback of the track. The user can play the first track (or start playback of the playlist) and as additional tracks are added, those added tracks may be played as part of the playlist once they are queued up (e.g., once a prior track is finished being played). As shown, the interfaces show a title section, a description section, and a playlist section, and where the title section and the description section populate with content before the playlist section.

In some embodiments, a user tutorial may generate a playlist and show the different UI instances as a means for teaching a user how to operate the system, possibly including additional actions such as refining a playlist, saving a playlist, sharing a playlist with other users, and/or other actions.

Figure 6D:
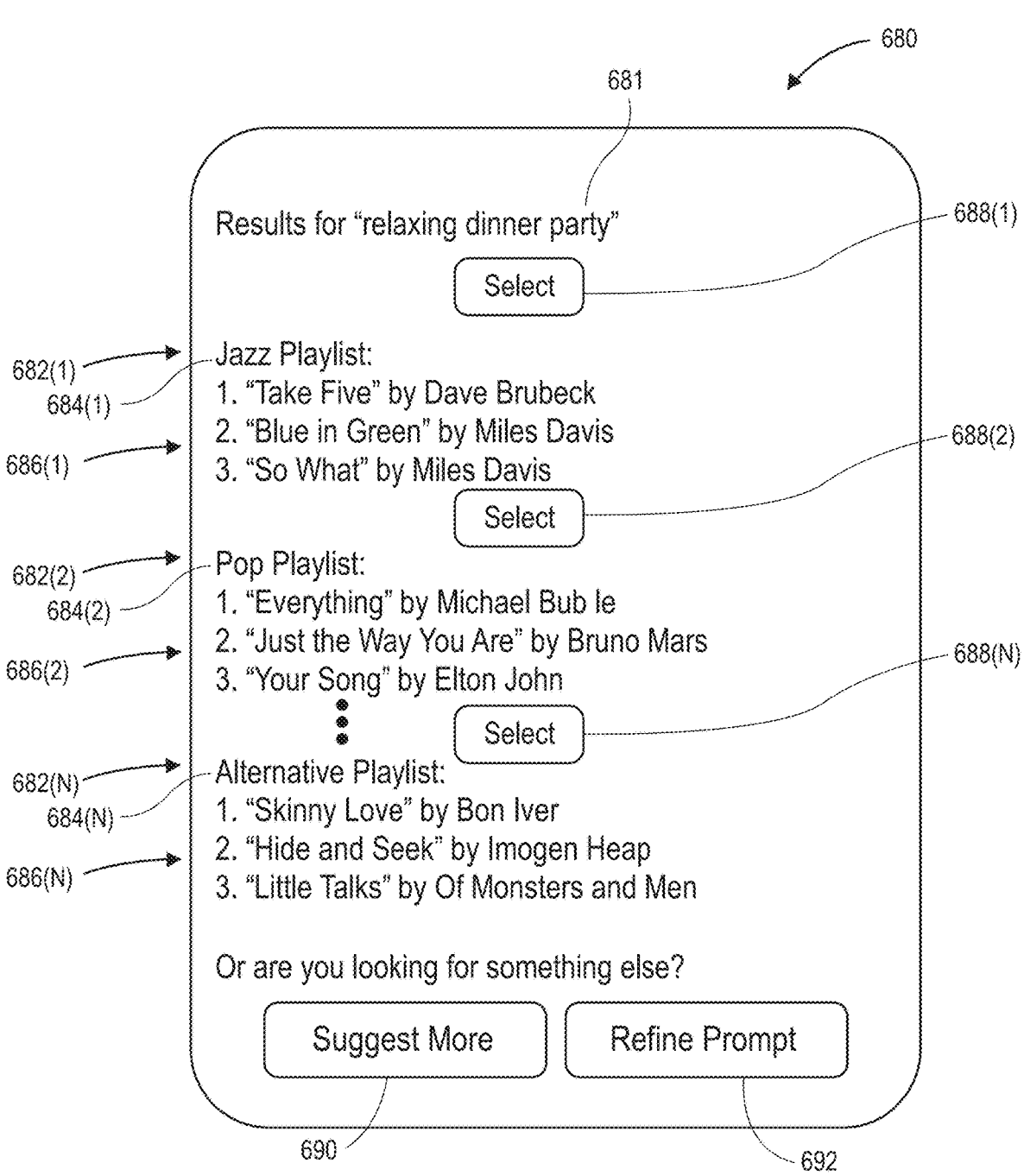
FIG. 6D is an illustrative user interface providing example snippets of playlists that are results from a user request, according to an implementation.

FIG. 6D is an illustrative user interface 680 providing example snippets of playlists that are results from a user request 681, according to an implementation. The user request 681 may be a natural language request, such as a request for a playlist for a "relaxing dinner party." The system may process the user request as described herein. Since this request is broad, the system may provide different interpretations of the request and generate a playlist for at least some of the interpretations. Even more narrow requests, such as "rock music" may be interpreted in different ways (e.g., guitar rock, classic rock, popular rock, 80s Rock, etc.).

The UI 680 may provide snippets of playlists, such as snippets 682(1), 682(2), . . . 682(N). A first snippet 682(1) may include an interpretation of "jazz" as fulfilling the request of "relaxing dinner music," while a second snippet 682(2) may be "pop" and a last snippet 682(N) may be "alternative." The first snippet 682(1) may include a first title 684(1) and a first partial listing 686(1) that is a partial list of media items or tracks that correspond to the first title 684(1) of the playlist. The second snippet 682(2) may include a second title 684(2) and a second partial listing 686(2) that is a partial list of media items or tracks that correspond to the second title 684(2) of the playlist. The last snippet 682(N) may include a last title 684(N) and a last partial listing 686(N) that is a partial list of media items or tracks that correspond to the last title 684(N) of the playlist. After presenting the snippets, the service may continue to retrieve tracks for each playlist while a user decides which playlist to select, via selection controls 688(1), 688(2), . . . 688(N). Thus, when a user selects a selection control, the corresponding playlist will be provided to the user, possibly using a user interface similar to the UI 630 described with reference to FIG. 6B. The UI may include additional media items or tracks in addition to the media items or tracks shown in the UI 680. For example, a preview of media items may show three media items representative of a certain playlist, while after selection of that playlist, the entire playlist may be presented to the user in a UI in any manner described herein, and including more tracks or all the tracks of the playlist (e.g., 15 tracks, etc.).

The UI 680 may include a suggest more control 690 to prompt the service to generate additional tracks for consideration by the user. The UI 680 may include a refine search control 692, which may enable the user to add refinements to a search query (e.g., the user request), or possibly a new request that modifies the current request and possibly generates additional snippets of playlists. The UI 680 may be presented as a default, upon user selection for snippets, or in response to a broad request for a playlist that can be fulfilled in various ways. A broad request may be a request that has a low confidence score, and thus may not satisfy a user's intent. For requests where the service has higher confidence scores (e.g., playlist for Taylor Swift country songs", etc.), the service may provide fewer snippets or only a single playlist to serve to the user.

In some embodiments, when a user request is broad and a confidence score of a result is low, the service may prompt a user to provide more information, possibly with suggestions. For example, a user may request "acoustic heartbreak songs" and the service may determine that many songs of different types match these criteria. The service may provide information to enable the user to refine the search, such as by providing the following output.

"Did you know that X songs talk about heartbreak? Sometimes it helps to get a little more specific, which best applies? A) They broke my heart, B) I'm eating my feelings, or C) Crying into pieces?

The suggestion above may be generated by the LLM and include text from actual media items or based on actual media items. However, the service may provide this information as snippets, as described above with reference to FIG. 6D.

Figure 7:
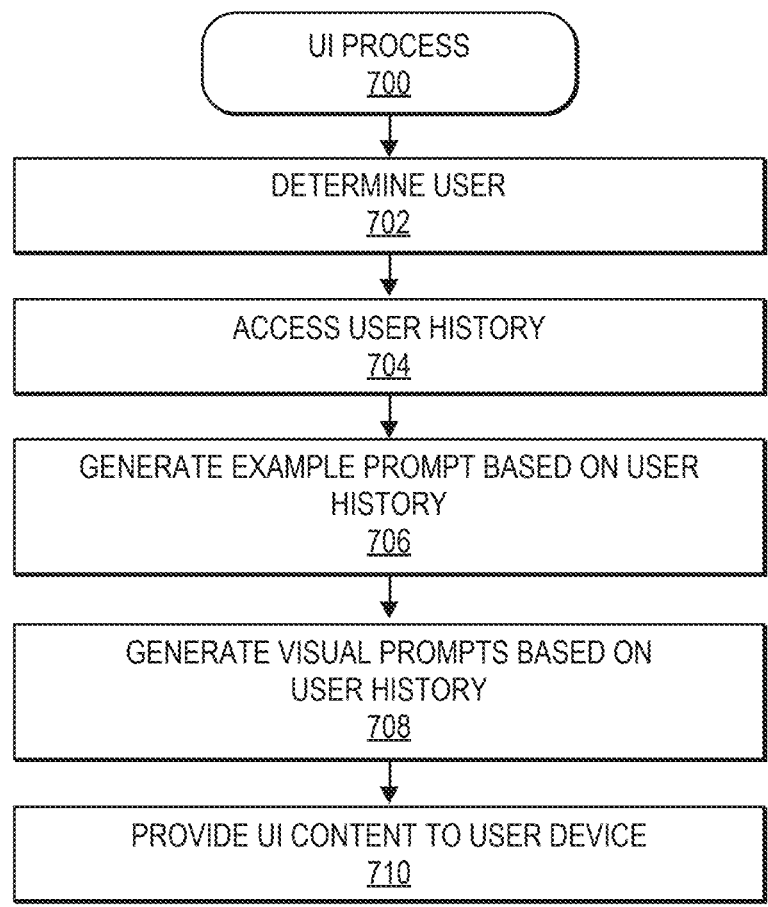
FIG. 7 is a flow diagram of an example process to populate a user interface with personalized search information, according to an implementation.

FIG. 7 is a flow diagram of an example process 700 to populate a user interface with personalized search information, according to an implementation. The process 700 may determine a user, as in 702. For example, the user interface may require a user to provide login credentials to access the service, which may enable identification of the user and/or access to user data, such as the user data 224.

The service may access user history, as in 704. The user history may be based on the user data 224 and/or other information. For example, the user history data may include a subset of information about the user that pertains to searches for playlists or interaction with media content from a media catalog.

The service may generate an example search based at least in part on the user history, as in 706. Thus, the example may be created as a personalized example that is unique for the user and not provided to all other users (e.g., like a generic example). The example search may be provided in the user interface in the personalized example section 610. The example search may be segmented into selectable visual search suggestions. The personalized example may be formed of unstructured data and may resemble or may form a natural language input.

The service may generate personalized visual search suggestions based at least in part on the user history, as in 708. The personalized visual search suggestions may include virtually any words, such as names of artists, names of songs, genres, moods, personal interests, temporal information, feelings, things to exclude or omit, or other text. The personalized visual search suggestions may be generated based on user data associated with the user, prior searches by the user, or other personalized information. The visual search suggestions may be added to the input field 604 and may be combined with other information, such as text inputs, voice inputs, and/or part or all of the example search from the personalized example section 610.

The service may provide the user interface, such as the user interface 600 described with reference to FIG. 6A, to the user device, as in 710. The user interface may be populated with some or all of the data generated in the steps described above pertaining to the user interface and the process 700.

Figure 8:
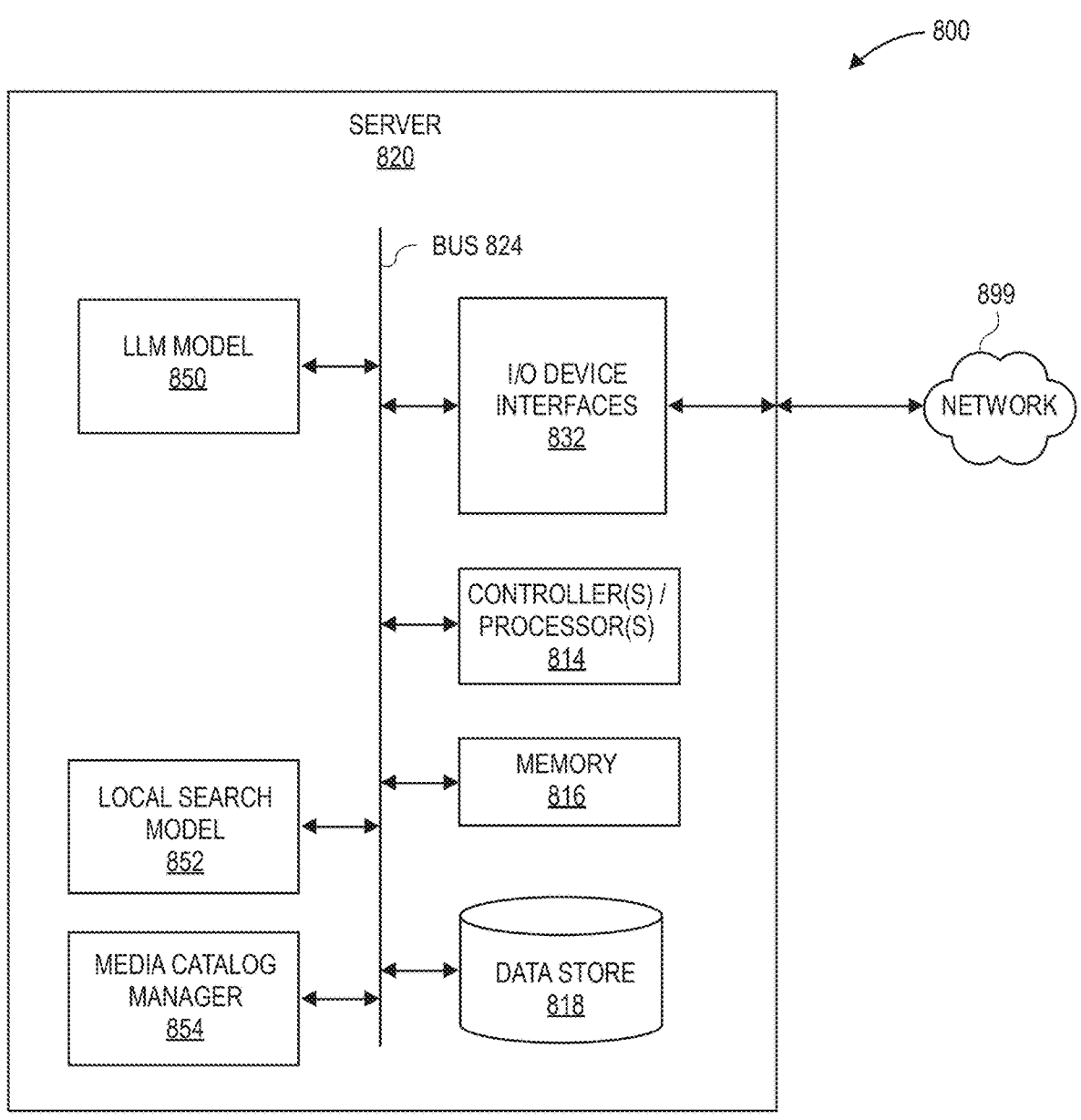
FIG. 8 is a block diagram of an illustrative implementation of a server system that may be used with various implementations.

FIG. 8 is a block diagram conceptually illustrating example components 800 of a remote computing device, such as a remote server 820 that may include and/or execute one or more of the above discussed implementations. Multiple such servers 820 may be included in the system.

Each of these server(s) 820 may include one or more controllers/processors 814, that may each include a central processing unit (CPU) for processing data and computer-readable instructions, and a memory 816 for storing data and instructions. The memory 816 may individually include volatile random access memory (RAM), non-volatile read only memory (ROM), non-volatile magnetoresistive random access memory (MRAM) and/or other types of memory. Each server may also include a data storage component 818, for storing data, controller/processor-executable instructions, training data, labels, access request log entries, access control policy sets, etc. Each data storage component may individually include one or more non-volatile storage types such as magnetic storage, optical storage, solid-state storage, etc. Each server may also be connected to removable or external non-volatile memory and/or storage (such as a removable memory card, memory key drive, networked storage, etc.), internal, and/or external networks 899 (e.g., the Internet) through respective input/output device interfaces 832.

Computer instructions for operating each server 820 and its various components may be executed by the respective server's controller(s)/processor(s) 814, using the memory 816 as temporary "working" storage at runtime. A server's computer instructions may be stored in a non-transitory manner in non-volatile memory 816, storage 818, and/or an external device(s). Alternatively, some or all of the executable instructions may be embedded in hardware or firmware on the respective device in addition to or instead of software.

Each server 820 includes input/output device interfaces 832. A variety of components may be connected through the input/output device interfaces. Additionally, each server 820 may include an address/data bus 824 for conveying data among components of the respective server. Each component within a server 820 may also be directly connected to other components in addition to (or instead of) being connected to other components across the bus 824. Each server may also include one or more trained LLM models 850, one or more local search models 852, and a media catalog manager 854, as discussed herein. The media catalog manager 854 may access outputs from the models and match with items in a media catalog. The media catalog manager 854 may create and maintain metadata for the media content.

The components of the server(s) 820, as illustrated in FIG. 8, are exemplary, and may be located as a stand-alone device or may be included, in whole or in part, as a component of a larger device or system.

The following description provides additional details about various embodiments discussed herein. The local search model described herein may be provided by another entity and may not be physically controlled and/or located with the service. The local search model may process complex requests that are structured, such as requests that include multiple artists, artist and genre information, and exclusions (e.g., "not jazz"), among other possible structured data.

The described system(s) are re-imagining to allow users to discover content to listen to through voice requests/ conversations, text queries, and interactive voice/visual refinements with text-to-text models pre-trained on the cultural knowledge from the web describing content and creators, and internal text data like podcast transcripts and artist biographies, genre tags, etc. The system(s) may respond to any natural language (voice or text) user request, however ambiguous or complex (e.g., "spooky podcast with a twist ending for a car ride with the family", "a feel-good, coming-of-age story", "pick me up music for a rainy day in Seattle", "German music to put the toddlers to sleep", "90s music with a happy and uplifting feel"). While text-to-text models can tap into cultural knowledge, audio-to-text models can help describe song attributes such as key, tempo, and audio similarity which is especially important for recent releases and less popular content, allowing these songs to participate in recommendation experiences.

The system(s) may enhance how content is presented to users by generating image, text, and voice descriptions that are engaging and personalized. The system(s) may generate personalized artwork using text-to-image models for playlist cover art, profile images, and content representation for marketing campaigns. The system(s) may describe music or spoken word recommendations to users in a personalized manner that resonates with their interests, intent, and how they think about content (like "10 scary podcasts that both parents and kids love", "2-min summaries of 5 must-read coming to age YA books", "Uplifting modern jazz music from Chicago just for you"). The system(s) may generate entire multi-modal (voice and visual) experiences, that introduce music, podcast, and livestreams to the users using personalized language and visuals. The system(s) may explain why they are recommended content in that moment, and how it relates to things users know, culture and community (like "BBC interviews with the Grammy winning artists you have been binging on", "perfect podcasts for your daily drive", "to enjoy putting the little ones to bed, success guaranteed", "something for everyone in the family while cooking dinner", "because you enjoy a blend of middle eastern and lo-fi music").

Summaries of podcasts or audio books (text-to-text/audio), music (audio to text/audio), and related cultural information have outsized potential to make the journey of discovering content as much fun as listening to it and improve user engagement. With text-only models, system(s) may select short bites and generate personalized summaries of varying length (from a 30-second teaser to a 30-minute short version) from podcast and audio books. Like, "Give me a 5-minute summary of the latest TechCrunch podcast on ChatGPT for non-experts", or "Remind me what happened in the podcast episodes I listened to so far." System(s) may extract themes and topics from podcast to tag content and improve content discovery and moderation, and better connect listeners with creators. With audio models, system(s) may extract the most representative or catchy snippet of a song, create summary mixes blending snippets from songs on a playlist to offer a preview or rapid discovery; and improve content metadata, including detecting fraudulent, duplicate or poor-quality content.

Knowledge cut-off: LLMs are trained with data up to a specific date, known as the knowledge cut-off date. When using an LLM with a certain knowledge cutoff to generate tracks for a prompt, it cannot recommend tracks released after its knowledge cut-off date or understand references to artists that have only emerged around that time or after. In fact, even before the knowledge cutoff there is a bias toward older content (hypothesis: older content has had more opportunity to be written about). This gap manifests in the following ways described below.

User explicitly requests for recent content in their prompt by specifying a year "2023" or using terms like "new" or "latest." User specifies new artist, for example Peso Pluma, Ice Spice, Ferxxo. Using the LLM to generate tracks won't provide relevant recent tracks for such requests. Users may not explicitly mention recency, but it's implied. For instance, "K-Pop music for a summer pool party." Not surfacing recent content here is a missed opportunity, although the results are still correct, they most likely won't be relevant enough especially for a fast moving genre like K-Pop. Users seek content related to recent world events, cultural moments, or trending topics, like music from recent festivals, awards, movies, or TV shows. For example, "Playlist to get me ready for the Grammys". Without mitigation, LLMs may provide incorrect results for these queries.

Lack of music knowledge: System(s) see LLMs make silly mistakes in returning songs with names that match the genre in the prompt (e.g., instance of response including Adele's Rolling In The Deep for request for "Rock and Roll music"). Results for similar track/artist queries often result in content only from that artist, thus missing the user's intent. Cases where the user specifically excludes some artists or genres are at times ignored. Cases where the user specifically requests a genre can be ignored.

Relevance: When the user prompts for a mood or activity playlist but does not specify their preference for artist, genre in the prompt, the returned tracks reflect the inherent popularity bias of LLMs and seemingly different prompts can have same tracks returned. Popularity bias is also very noticeable in similarity queries (e.g. "Make me a mix with Bruce Springsteen, Tom Petty, and more")

To address these gaps, system(s) may implement several approaches to improve and complement the main LLM prompt that generates a playlist (the bag-of-track/BoT). Personalization—System(s) are including personalization signals (e.g. user's favorite artists, genres) as context to the bag of tracks (BoT) LLM with instructions to pick from the user's taste when the prompt is more open ended. Information extraction (IE)—When users specify artist/genre/mood/activity/similar-to/negation in their prompt, system(s) may use an LLM or other system to extract this information and decide whether an internal API can fulfill the request. If so, the system will use the API results instead of the LLM output. This approach may enable systems to bring in new releases for these, but not all types of requests. This can be interpreted as the LLM doing NLU or alternatively code generation (as system(s) map specific patterns of information to the corresponding API calls). Query reformulation (QR)—System(s) may use an LLM to reformulate user queries into natural or structured queries that existing Search APIs can handle. This query reformulation approach can support new releases by leveraging the LLM's knowledge to inform systems on how to find relevant tracks—as opposed informing systems of the tracks outright. In this approach the Search APIs apply traditional natural language understanding (NLU) models to the queries and system(s) and may ensemble results across multiple queries. Some approaches have different pros, cons, and risks and system(s) are pursing both in parallel to learn how well each can close portions of the recency gap.

Fine-tuning (FT)—System(s) may evaluate fine-tuned LLMs on content recommendation, certain tasks against the current LLM, which cannot be fine-tuned. To initiate this process, system(s) may compile a comprehensive dataset detailing the music releases, covering essential information such as artist, album, track names, and release dates. System(s) may also incorporate data related to genres, lyrics, artist biographies, album reviews, X-ray factoids, and search queries.

Retrieval augmented generation (RAG)—System(s) are exploring using different mechanisms to identify candidates not known to the LLM and describe them with text in a prompt. System(s) may explore using 1) Info Domain services, 2) a secondary LLM fine-tuned with text data not used by the primary LLM, 3) nearest neighbor retrieval using semantic embeddings (using the same text data used for fine tuning and search traffic for fine tuning the embeddings using successful query-entity pairs).

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow charts shown in FIGS. 3, 4, 5, and 7, orders in which such methods or processes are presented are not intended to be construed as any limitation on the claimed inventions, and any number of the method or process steps or boxes described herein can be combined in any order, in parallel, and/or be omitted to implement the methods or processes described herein. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
receiving a natural language (NL) request from a user for a playlist of music;
sending, to a large language model (LLM), the NL request with first instructions including at least labels to create structured data from unstructured data in the NL request;
receiving, from the LLM, structured data based at least in part on the NL request;
sending the structured data, the NL request, or both to the LLM with second instructions to generate a first play-list of music;
sending at least the structured data to a music search model to generate a second playlist of music;
receiving the first playlist of music from the LLM;
receiving the second playlist of music from the music search model;
selecting, based on arbitration logic, at least a first portion of the first playlist of music, at least a second portion of the second playlist of music, or the first portion and the second portion for delivery to the user as the playlist, wherein the arbitration logic includes at least a comparison of the NL request to the structured data; and
providing the playlist to the user.

2. The computer-implemented method of claim 1, further comprising:
locating music content for tracks of music included in the playlist; and
providing, to the user, controls to cause playback of the music content along with the playlist.

3. The computer-implemented method of claim 1, further comprising:
sending at least some user history data associated with the user to the music search model with the structured data, wherein the user history data indicates past user inter-action with a music catalog; and
wherein the second playlist is based at least in part on the structured data and the user history data.

4. The computer-implemented method of claim 1, wherein:
the playlist includes a listing of tracks from at least some different artists, wherein at least one of the tracks or one of the different artists are associated with the structured data.

5. The computer-implemented method of claim 1, further comprising:
determining that the NL request includes a request for music published within a threshold of time before the request; and
selecting the second playlist of music based at least in part on the request for music published within the threshold of time before the request.

6. The computer-implemented method of claim 1, wherein:
the second instructions include a request for at least one of a title, artwork, or a description for the second playlist; and
the providing the playlist to the user includes providing the at least one of the title, the artwork, or the description with the playlist.

7. A system, comprising:
one or more processors; and
a memory storing program instructions that when executed by the one or more processors cause the one or more processors to at least:
receive a natural language (NL) request from a user for a playlist of media;
send, to a large language model (LLM), a first request with at least the NL request and first instructions to create structured data from the NL request;
send, to the LLM or an additional LLM, a second request with second instructions to generate a list of media items based at least in part on the NL request and the structured data;
receive, from the LLM or the additional LLM, the list of media items;
associate at least a portion of the media items with corresponding tracks available for playback from a media catalog; and
send, to the user, a playlist including at least the portion of the media items with the corresponding tracks available for playback from the media catalog.

8. The system of claim 7, wherein the program instructions that when executed by the one or more processors further cause the one or more processors to at least:
send an additional request to a media search model with at least the structured data to generate an additional list of additional media items based at least in part on the structured data;
receive the additional list of the additional media items from the media search model;
associate at least a portion of the additional media items with additional corresponding tracks available for play-back from the media catalog; and
add to the playlist at least some of the additional media items with the additional corresponding tracks.

9. The system of claim 8, wherein the program instructions that when executed by the one or more processors further cause the one or more processors to at least:
select, based on arbitration logic, the at least some of the additional media items for the playlist, wherein the arbitration logic includes at least a comparison of the NL request to the structured data.

10. The system of claim 8, wherein the program instructions that when executed by the one or more processors further cause the one or more processors to at least:
determine that the NL request includes a request for media items published within a threshold time from the request; and
wherein the second request includes at least some user history data that indicates past user interaction with a media catalog.

11. The system of claim 7, wherein the program instructions that when executed by the one or more processors further cause the one or more processors to at least:
send, to the LLM, a request for a description of media items based on the NL request;
receive, from the LLM, the description; and
send, to the user, the description with the playlist.

12. The system of claim 7, wherein the program instructions that when executed by the one or more processors further cause the one or more processors to at least:

determine that a certain media item from the LLM does not include a corresponding track in the music catalog; and omit the certain media item from the playlist.

13. The system of claim 7, wherein the program instructions that when executed by the one or more processors further cause the one or more processors to at least:

create the playlist by linking the corresponding tracks in the music catalog to the media items to enable playback of the media from the music catalog.

14. The system of claim 7, wherein the program instructions that when executed by the one or more processors further cause the one or more processors to at least:

receive a second NL request from the user to refine the list of media items;

send a third request to the LLM or the additional LLM, with at least part of the second NL request to refine the list of media items;

receive, from the LLM or the additional LLM, an updated list of media items; and update the playlist with at least a portion of the updated list of media items.

15. A method, comprising:

receiving a request from a user for a playlist of media;

sending, to a large language model (LLM), a first request with at least the request and first instructions to create structured data from the request;

sending, to the LLM or an additional LLM, a second request with second instructions to generate a list of media items based at least in part on the request and the structured data;

receiving, from the LLM or the additional LLM, the list of media items;

associating each of the media items with corresponding tracks in a media catalog; and sending, to the user, a playlist including at least a portion of the media items with the corresponding tracks from the media catalog.

16. The method of claim 15, further comprising:

receiving an additional request from the user to refine the list of media items;

sending a third request to the LLM or the additional LLM, with at least the additional request to refine the list of media items;

receiving, from the LLM or the additional LLM, a refined list of media items; and modifying the playlist with the refined list of media items.

17. The method of claim 15, further comprising:

sending an additional request to a media search model with at least the structured data to generate an additional list of additional media items based at least in part on the structured data;

receiving the additional list of the additional media items from the media search model; and adding to the playlist at least some of the additional media items based at least in part on arbitration logic that compares at least the request to the structured data.

18. The method of claim 15, further comprising:

creating the playlist by linking the corresponding tracks in the music catalog to the media items to enable playback of the media from the music catalog.

19. The method of claim 15, further comprising:

sending to the LLM an additional request for at least one of a description, artwork, or a title for the media items;

receiving the at least one of the description, the artwork, or the title from the LLM; and sending, to the user, the at least one of the description, the artwork, or the title with the playlist.

20. The method of claim 15, wherein:

the media items include at least one of an audible file, a music track, a podcast, or a video.

\* \* \* \* \*